July 24, 1951  R. P. JOHNSON  2,561,662
CONSECUTIVE-READING GAUGING DEVICE
Filed April 22, 1949
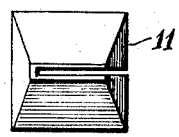
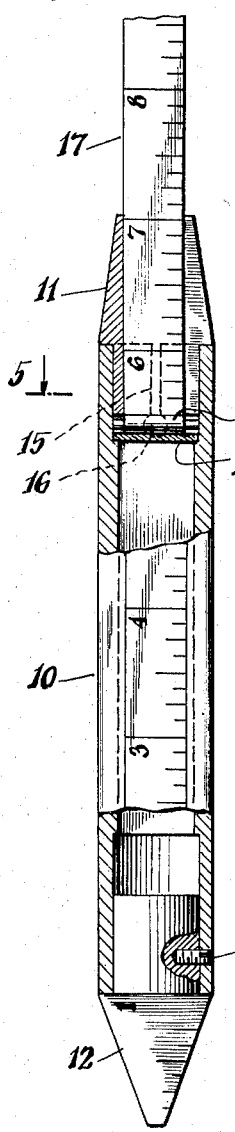
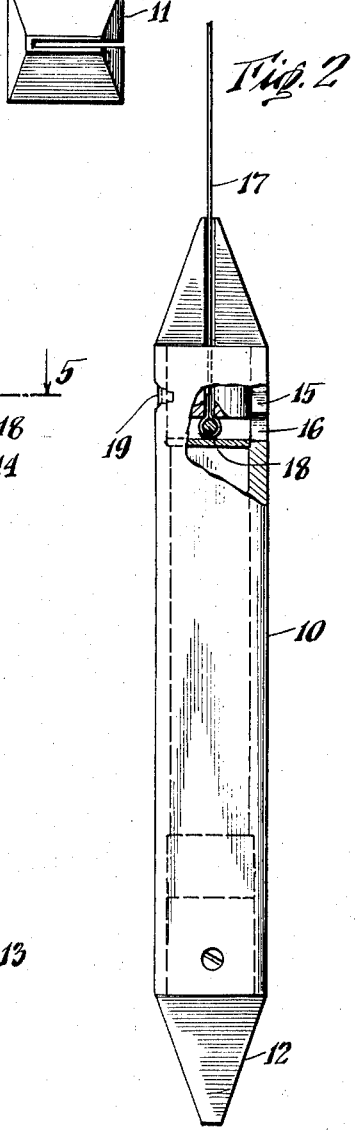
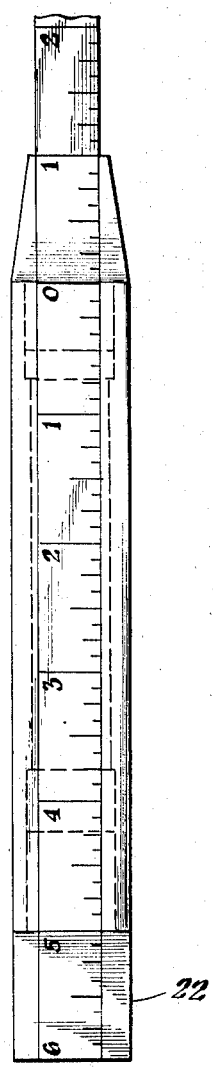
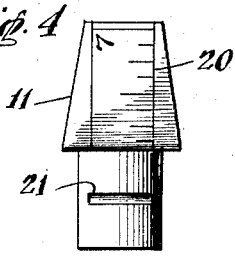
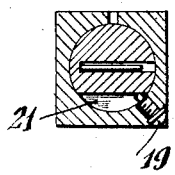
INVENTOR.
Raymond P. Johnson
BY
AGENT OR ATTORNEY Patented July 24, 1951

2,561,662

UNITED STATES PATENT OFFICE 2,561,662

CONSECUTIVE-READING GAUGING DEVICE

Raymond P. Johnson, New Baltimore, N. Y., assignor to Socony-Vacuum Oil Company, Incorporated, a corporation of New York Application April 22, 1949, Serial No. 89,098

3 Claims. (Cl. 33—126.5)

This application is directed to gauging devices used in determining the amount of liquid in large tanks. It is particularly directed to a combination of bob and tape which can be readily and easily connected or disconnected.

In many industries it is necessary to maintain large quantities of liquid material in storage prior to processing or distribution. This is particularly true of the petroleum industry in the oil fields, at the refineries, and at the distribution points. These liquid petroleum stocks are stored in large tanks which may be of thousands of gallons capacity. It is important in the operation of this industry that the quantity of material within these tanks be known with a reasonable degree of accuracy. This information has been furnished in the prior art by dropping a plumb bob on the end of a scale tape into the tank to determine the height of liquid therein. Knowing the physical dimensions of the tank, the quantity of liquid can be calculated by simple mathematics.

In some cases, it is expedient to drop the bob to the bottom of the tank and read the tape at the point where the wetting stops. For this purpose an innage bob is used inasmuch as the result is the amount of material in the tank. In other cases, however, it is more expeditious to drop the bob to the surface of the liquid and determine the distance from the top of the tank to the surface of the liquid. For this purpose an outage bob is used, the result being the amount of material that can be accommodated in that tank. This value can be subtracted from the known total capacity of the tank to determine the amount of liquid in the tank.

In tanks of this type, water is continually condensed from the air above the liquid within the tank because of the fluctuating air temperature. The water accumulates on the bottom of the tank. In order to determine accurately the amount of product or stock in the tank, the quantity of water must be determined and this subtracted from the calculated amount of oil obtained by using an innage or outage bob, as hereinbefore indicated. Several chalks, paints, and pastes have been used in the prior art for this purpose. The innage bob and lower end of the scale are painted or covered with the chalk. The paint or chalk is brought into contact with the water when the innage bob is lowered to the bottom of the tank. The chalk, paint or paste is removed by water, or its color is changed, whereas the chalk, paint or paste is unaffected by the petroleum stock above the water. Thus the water level and quantity is readily determined at the same time that the product or stock height is taken. By this procedure, however, the plumb bob and lower portion of the scale must be repainted after each reading. In a manner similar to the above-described method of taking outage readings, the water level can be determined by using an outage bob.

Inasmuch as the water level in these tanks is usually low, the level usually occurs along the length of the innage bob. It is desirable, therefore, that the innage bob have scale readings on its surface to permit reading the water level without resort to another scale. A further improvement is obtained by having the scale readings on the bob positively aligned with the scale readings on the tape, enabling the operator to quickly find the reading.

For a variety of reasons, it is convenient to be able to rapidly and easily disconnect the bob from the tape and connect it to the tape. For example, it is convenient to disconnect the bob, after a reading has been taken, in order to apply the paint or chalk for the next reading. As another example, it may be desired to disconnect the bob from the scale while carrying it from one tank to another. This is desirable because the thin steel tape may be permanently bent by the weight of the bob if carried improperly or stored improperly.

The prior art shows a perforated lug on the top or cap of the plumb bob for engagement with a snap hook secured to the lower end of the tape. This is unsatisfactory for several reasons. For example, there is a dead spot about the point of attachment where no readings can be taken directly. If the water level occurs in that region a scale must be placed alongside the bob and tape to obtain the water reading. As another example, the bob tends to oscillate on the end of the scale causing the scale readings on the bob to be out of alignment with the scale readings on the tape. This tends to make it more difficult to find the water reading when the bob is removed from the tank. As a further example, the motion of the snap hook causes the eye or perforated lug to wear. The free movement at the point of attachment makes it possible for erroneous readings to be taken.

The object of this invention was to provide a tank gauging device for use in measuring the water and petroleum liquid levels in supply and storage tanks which could be readily and easily connected to and disconnected from a tape scale, and which would read continuously along the length of the bob and scale, and on which the scale markings on the bob would always be aligned with the scale markings on the tape.

In order that the invention may be clearly understood, it will be described in detail hereinafter, reference being made by reference numbers to the attached drawing, in which;

Figure 1 is a vertical elevation of the front of the innage bob, a portion of which is shown in section, and in which;

Figure 2 is a vertical elevation of the side of the innage bob, a portion of which is shown in section, and in which;

Figure 3 is a plan view of the bob cap, and in which;

Figure 4 is a vertical elevation of the bob cap, and in which;

Figure 5 is a horizontal cross-section of Figure 1 through the plane 5—5, and in which:

Figure 6 is a vertical elevation of the outage bob.

The innage bob, as shown on Figure 1, is composed primarily of three members, an elongated body 10, a generally pointed cap 11, and a similar shaped base 12. The body has cylindrical, axially-aligned holes in each end into which the cap 11 and base 12 are inserted. The plug portion of the base 12 fits tightly in the lower hole in the body 10 and is locked in place by a lock screw 13 threaded into it through a hole in the side wall of the body 10. The plug portion of the cap is fitted to the upper hole in the body 10 sufficiently tight to prevent rotation of the cap relative to the body during normal use of the plumb bob and yet sufficiently loose to permit the cap to be rotated by hand when desired. The body 10 can be of any suitable cross-section, such as, for example, circular, square, or rectangular. A square cross-section, however, is preferred. The cap 11 and base 12 can be of generally conical or pyramidal shape. In the embodiment shown on Figure 1, the body 10 has a hollow center of circular cross-section, the inside diameter being smaller than the inside diameter of the holes in the ends. A circular disc 14 is driven into the upper hole of the body 10 before the cap 11 is inserted to seal the hollow center of the body 10 from the outside. The disc bears against the internal shoulder located at the bottom of the upper hole.

The cap 11 has a vertical slot which passes through it and extends through one side. The upper end of the body 10 has a similar vertical slot through the side wall surrounding the upper, axially-aligned hole. A transverse hole 16 is located at the bottom of the vertical slot in the body 10 at a location immediately above the disc 14. By rotating the cap 11 to a predetermined location, the two slots in the cap 11 and body 10 can be made to register and a suitable scale tape 17 inserted therethrough into the bob. A pin 18, attached to the end of the tape 17, is made smaller than the hole 16 so that it can be installed in the bob through the hole 16. After the tape 17 and pin 18 are installed in the bob the cap 11 can be rotated to place the vertical slots in the cap 11 and body 10 out of alignment. The pin 18 is made larger in diameter than the width of the slot in the cap to lock the tape in the bob. When in the locked position, the pin 18 is held between the disc 14 and bottom surface of the cap 11, preventing any movement of the pin 14 and tape 17 relative to the body 10. Graduations are suitably located on the outside of the base 12, body 10, and cap 11, starting from zero at the bottom. The graduations on the tape 17 are made so that when the cap 11 is rotated to lock the tape 17 in the bob the graduations on the cap 11 and tape 17 are brought into alignment with the graduations on the outside of the base 12 and body 10 to form a continuous-reading scale.

In Figure 2 is shown a side view of the innage bob with a portion illustrated in section. The tape 17 and pin 18 are indicated in the locked position in the bob. The set screw 19 is threaded through the wall of the body 10 to serve a multiplicity of purposes. The screw 19 has a cylindrical tip of reduced diameter in axial alignment with the axis of the screw. The tip of the screw 19 locates in a horizontal slot in the plug portion of the cap 11, described hereinafter.

Figure 3, a plan view of the cap 11, shows the location of the slot into which the tape 17 is inserted. The appropriate graduations are placed on the sloping side of the cap 11, spaced to read correctly when viewed horizontally.

Figure 4 is a vertical elevation of the cap 11 showing the graduations 20 on the sloping side. The horizontal slot 21, located in the plug portion of the cap 11, is adapted to cooperate with the screw 19, described hereinbefore. The cylindrical tip of the screw 19 is made smaller in diameter than the width of the slot 21 so that it can penetrate the slot. The tip of the screw 19, therefore, prevents vertical movement of the cap 11 relative to the body 10. In addition, the tip of the screw 19 acts as a stop to limit the extent of rotation of the cap when installing or removing the tape 17.

Figure 5 shows a cross-section of the bob as shown on Figure 1 through the section 5—5. The fit between the plug portion of the cap 11 and the upper hole in the end of the bob 10 is made tight enough to prevent the cap 11 from rotating in normal usage of the bob. This prevents the tape from working out of alignment with the graduations on the bob surface after the tape has been installed in the bob. This friction grip can be increased by the set screw 19. The diameter of the set screw 19 is larger than the width of the horizontal slot 21 in the cap 11. By tightening the set screw 19, the shoulder on the end of the screw is brought to bear against the plug portion of the cap 11 on each side of the slot 21, increasing the friction grip between the cap 11 and body 10.

In Figure 6 is shown the outage bob incorporating the instant invention. The construction of the outage bob is similar to the innage bob with the exception of the shape of the base 22. The bottom of the base 21 is made flat in order to set up a ripple on the surface of the liquid when the bob is lowered into the liquid. The ripple can be seen by the operator from the top of the tank, indicating that the surface has been pierced by the bob. This is necessary because the operator may be a considerable distance above the liquid surface when taking the reading, for example, 50 or 60 feet above the surface. Under such conditions, it is difficult to determine when the bob has reached the surface without a surface-indicating means. The liquid level usually wets the outage bob somewhere on the bottom six inches of the bob. The zero of the scale is placed near the top of the bob so that the operator can read down to the mark made by the liquid on the bob. This reading can then be added to the scale reading taken at the top of the tank to obtain the true outage reading. Addition of scale readings is an easier process than subtraction, and can be done with less chance of error.

The body 10 of these bobs can be made of soft material, for example, brass or a soft bronze. The cap 11 and bases 12, 22, however, are sometimes brought into hard contact with the metal portions of the tank during the gauging operations. It is, therefore, preferable that they be made of a hardened material, such as, for example, beryllium bronze, to prevent them from being damaged by the contact. It is desirable that they be constructed of non-sparking material to provide for greater safety when gauging inflammable materials.

The invention is not intended to be limited to the specific examples described hereinbefore. The invention is intended to be limited only by the following claims.

I claim:

1. A tank gauging bob comprising in combination a vertical elongated body, said body possessing circular axial holes in each end, a base adapted to be partially inserted in the lower end of said body, means to lock said base in said body, a cap adapted to be partially inserted in the upper end of said body, said body possessing a vertical slot in the upper end wall surrounding said upper hole, said cap possessing a vertical slot which passes through the cap and extends through one side wall, said cap possessing a horizontal slot in the portion of said cap which penetrates the hole in said body, a locking means projected through the end wall of said body surrounding said upper hole adapted to penetrate the horizontal slot in said cap to limit the movement of said cap, a graduated tape adapted to be inserted through the vertical slots in said body and cap when the cap is rotated into a position which brings the slots into juxtaposition, a pin attached to the end of said tape for preventing longitudinal movement between the tape and body when they are connected, said base, body, and cap possessing graduations on their outer surfaces whereby when said tape and pin are inserted in the vertical slots in said body and cap and the cap is rotated to a position which brings the graduations on the base, body, cap and tape into alignment, forming a consecutive reading scale, the pin and tape are held in a fixed position relative to said body.

2. A tank gauging device comprising in combination an elongated body having an axial circular hole in one end and possessing an axial slot with a hole at the bottom thereof through the wall formed by the axial hole, a cap adapted to engage in the axial hole in said body, said cap possessing a transverse slot, a screw possessing a reduced diameter tip, said screw adapted to be threaded through the wall of said body to introduce the tip of said screw into the transverse slot in said cap, said cap possessing an axial slot in one side, a tape, a pin attached to the bottom of said tape, whereby when the tape and pin are inserted into the axial slots in said cap and body the cap can be rotated to lock the tape in the body.

3. A tank gauging device comprising in combination an elongated body, means defining a cylindrical cavity in one end of said body, said cavity having its axis aligned with the axis of the body, a cap, means formed integral with said cap adapted to be inserted in said cavity, said cap having a substantially pointed end, a tape, a pin attached to the end of said tape extending beyond the edges of the tape, means defining axial slots in the end of said body and side of said cap adapted to register by rotation of said cap to a predetermined position relative to said body to receive said tape and pin, means for securing said pin in fixed position relative to said body after said cap is rotated, and common means for limiting the extent of rotation of said cap relative to said body and maintaining said cap in engagement with said body.

RAYMOND P. JOHNSON.

REFERENCES CITED

The following references are of record in the file of this patent:

UNITED STATES PATENTS

| Number | Name | Date |
| --- | --- | --- |
| 1,680,297 | Lewis | Aug. 14, 1928 |
| 2,226,060 | Johnson | Dec. 24, 1940 |
| 2,381,698 | Sireci | Aug. 7, 1945 |